Dec. 31, 1957  N. E. BERRY  2,818,234
HEATING AND COOLING SYSTEM
Filed May 12, 1955
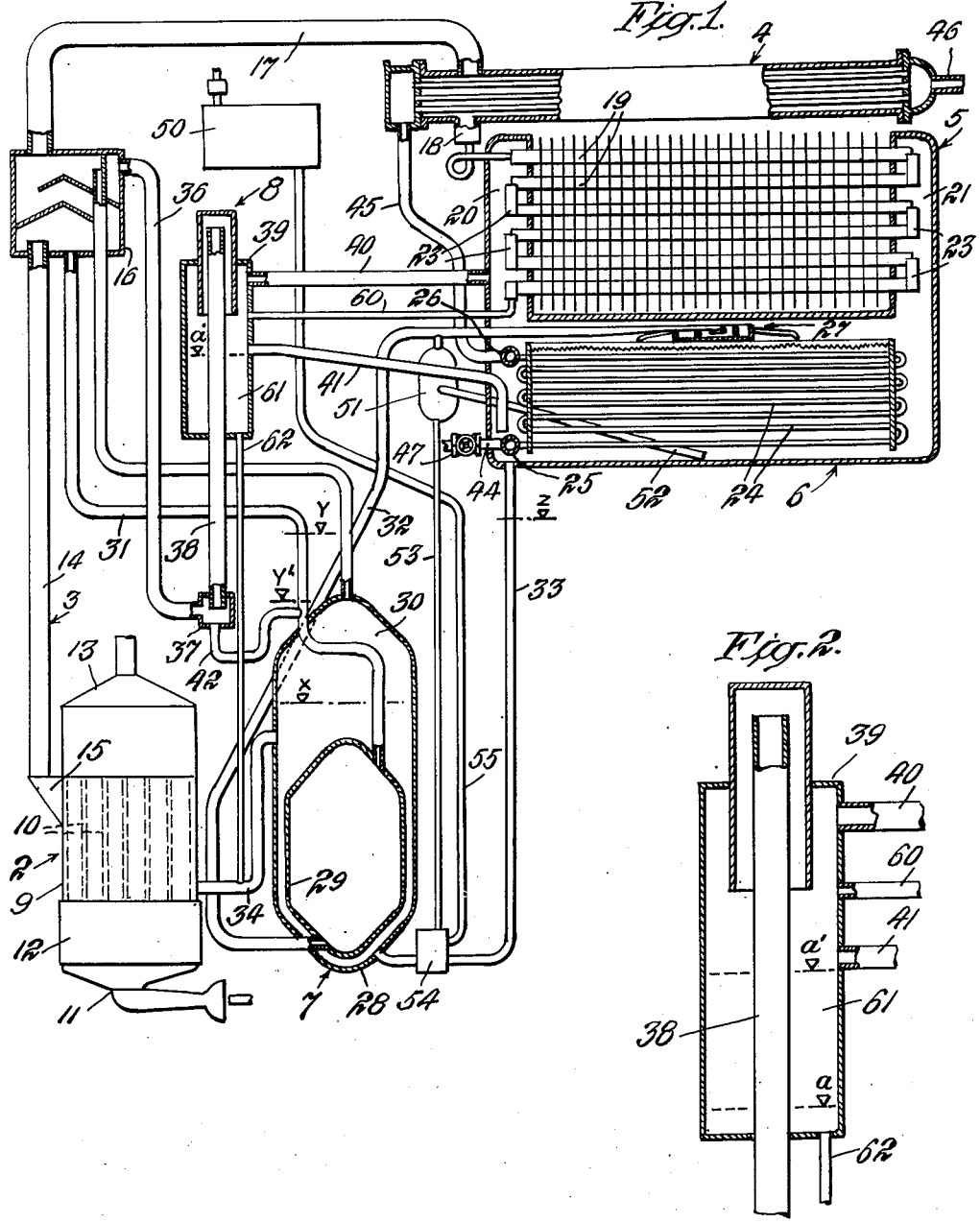
INVENTOR.
Norton E. Berry
BY
Oliver S. Titcomb
his ATTORNEY United States Patent Office 2,818,234
Patented Dec. 31, 1957

2,818,234

HEATING AND COOLING SYSTEM

Norton E. Berry, St. Louis, Mo., assignor, by mesne assignments, to Arkla Air Conditioning Corporation, a corporation of Delaware Application May 12, 1955, Serial No. 507,774

7 Claims. (Cl. 257—9)

The present invention relates to a heat operated air conditioning apparatus for either heating or cooling and more particularly to a concentration control for regulating the concentration of a working fluid circulating in said apparatus.

The present invention is particularly adapted for use in a heat operated air conditioning apparatus of the type illustrated and described in my prior applications for United States Letters Patent Serial No. 286,677, filed May 8, 1952, and Serial No. 306,241 filed August 25, 1952, both applications now abandoned. The vacuum type apparatus disclosed in these applications contains a solution from which vapor of a volatile fluid is expelled from an absorbent by the application of heat. The expelled vapor is caused to flow either through a liquefier to a heat exchange element to provide a refrigerating system or through a bypass conduit directly to the heat exchange element to provide a heating system.

When the apparatus is operated as a heating system a dilute solution should be circulated to reduce the temperature at which vapor is expelled and thereby the rate of corrosion which is functionally related to the operating temperature. When the apparatus is operated as a refrigerating system a more concentrated solution should be circulated through the absorber to produce a low vapor pressure and refrigerating temperature in the heat exchange element. However, a concentration control vessel of the type described and claimed in the United States Letters Patent of Lowell McNeely No. 2,465,904, issued March 29, 1949, is apt to hold volatile working medium out of solution under some operating conditions on heating cycles when applied to an apparatus for both heating and cooling.

One of the objects of the present invention is to provide a concentration control for a heat operated air conditioning apparatus for both heating and cooling which produces the required concentration of absorbent when the apparatus is operated as a refrigerating system and insures a maximum dilution of solution when the apparatus is operated as a heating system.

Another object is to provide a concentration control vessel in the bypass conduit and connected to receive absorbent from the generator when the apparatus is operated as a heating system to insure maximum dilution of the solution.

Still another object is to provide a concentration control of the type indicated which is of simple and compact construction, economical to manufacture and reliable in operation.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawing:

Fig. 1 is a diagrammatic view of a heat operated air conditioning apparatus and showing the concentration control vessel in the bypass conduit; and Fig. 2 is an enlarged view of the concentration control vessel and showing the variation in the amount of refrigerant that may be stored as controlled by the height of the pressure balancing liquid column.

For the purpose of illustration the present invention is shown applied to a vacuum type air conditioning apparatus generally similar to that illustrated and described in my prior application Serial No. 306,241, referred to above. The apparatus is adapted for either heating or cooling and contains a water solution of a suitable salt such as lithium bromide or the like. The apparatus comprises a generator 2, vapor liquid-lift 3, condenser 4, heat exchange element 5 for either heating or cooling, an absorber 6, a combined liquid heat exchanger and leveling vessel 7, and bypass conduit 8 interconnected for the circulation of water either as a heating or cooling agent and salt solution at different concentrations.

Generator 2 comprises a vertical boiler in the form of a vessel 9 having tubes 10 extending between tube sheets at the top and bottom thereof. The generator 2 is heated by a suitable burner 11 and the products of combustion are confined by a depending skirt 12 to cause them to flow vertically through the tubes 10 into a dilution flue 13 connected to a suitable stack. Heat from the products of combustion is transmitted through the walls of the tube 10 to the solution in the generator 2 to expel water vapor from the lithium bromide solution.

The vapor liquid-lift 3 is like that described and claimed in my United States Letters Patent No. 2,625,800, issued January 20, 1953. Suffice it to state herein that the vapor liquid-lift comprises an upright lift tube 14 connected between a chamber 15 at the top and side of the generator 2 and a separating chamber 16. The vapor liquid-lift 3 utilizes vapor expelled in the generator 2 to raise solution into the separating chamber 16.

The top of the separating chamber 16 is connected to the condenser 4 by a vapor conduit 17. Condenser 4 may be of any suitable construction and is shown as a shell and tube type. The bottom of condenser 4 is connected to the heat exchange element 5 through an orifice device 18 like that described and claimed in my United States Letters Patent No. 2,563,575, issued August 7, 1951.

Heat exchange element 5 is like that described and claimed in United States Letters Patent to William L. O'Brien No. 2,426,044, issued August 19, 1947. Heat exchange element 5, constituting either an evaporator for cooling or a radiator for heating, comprises a plurality of finned tubes 19 extending between spaced headers 20 and 21. The ends of tubes 19 project into the headers 20 and 21 and cups 23 are provided at opposite ends of adjacent tubes to provide a continuous liquid path through successive tubes from the top to the bottom of the heat exchange element. The lower end of the headers 20 and 21 are mounted on or open into the absorber 6.

Absorber 6 is generally similar to that described and claimed in United States Letters Patent to Albert R. Thomas et al. No. 2,301,232, issued November 10, 1942, and comprises a cylindrical shell closed at opposite ends by the headers 20 and 21. A plurality of serpentine coils 24 are arranged vertically in side-by-side relation in absorber 6 and have their ends connected by headers 25 and 26. Overlying the coils 24 is a liquid distributor 27 adapted to deliver solution onto the uppermost section of each coil which drips from each coil section onto the next lowermost coil section from the top to the bottom of the absorber 6.

The combined liquid heat exchanger and leveling vessel 7 is like that described and claimed in United States Letters Patent to Walter M. Simpson No. 2,685,781, issued August 10, 1954, and comprises an outer casing 28 located below absorber 6 and extending above the generator 2. Casing 28 constitutes the outer passage and a closed casing 29 located within the outer casing constitutes the inner passage of the liquid heat exchanger 7. The inner casing 29 extends upwardly through only a portion of the height of the outer casing 28 to provide a chamber 30 for storing solution between periods of operation and maintaining a substantially constant level of solution acting on the generator during periods of operation. Thus, the outer casing 28 will be hereinafter referred to as a leveling vessel.

The solution circuit comprises a path of flow for solution weak in refrigerant from the separating chamber 16 to the absorber 6 and a path of flow for solution strong in refrigerant from the absorber to the generator 2. The path of flow for solution weak in refrigerant comprises a conduit 31 connecting the bottom of the separating chamber 16 to the inner passage 29 of liquid heat exchanger 7 and a conduit 32 connecting the inner passage to the liquid distributor 27 in the absorber 6. The path of flow for solution strong in refrigerant comprises a conduit 33 connecting the bottom of the absorber 6 to the outer passage 28 of the liquid heat exchanger 7 and also constituting a leveling vessel. The side of the leveling vessel 28 is connected to the base of the generator 2 by a conduit 34.

Bypass conduit 8 comprises a pipe 36 connecting the side of the separating chamber 16 to a chamber 37 below the liquid level Y indicated on conduct 31 in Fig. 1, an auxiliary vapor liquid-lift tube 38 projecting upwardly from chamber 37, a separating chamber 39, later to be described in detail, at the upper end of the auxiliary vapor liquid-lift and vapor and solution conduits 40 and 41 connecting the separating chamber to the header 20 of the heat exchange element 5 and the absorber 6, respectively. A liquid line 42 connects the chamber 37 at the base of the auxiliary vapor liquid-lift 46 to the conduit 31 in the path for solution weak in refrigerant. Thus, the chamber 37 and conduits 36 and 38 are immersed in solution and form a liquid trap when the solution stands at the level Y to prevent the flow of vapor through the bypass and the bypass 8 is opened to permit the flow of vapor therethrough when the solution level is depressed to a level Y' below the chamber 37.

The closing and opening of bypass 8 is controlled by cooling or not cooling the condenser 4. Absorber 6 and condenser 4 may be cooled by cooling water from any suitable source such as a city water main, cooling tower or the like. Cooling water is delivered to the coils 24 in the absorber 6 through a conduit 44 connected to the header 25. Cooling water flows from the header 26 through a conduit 45 to one end of the condenser 4. The cooling water flows through the tubes of the condenser 4 and is discharged from the opposite end of the condenser through a conduit 46. A suitable valve 47 is provided in the supply main 44 for controlling the flow of cooling water and thus controlling the operation of the apparatus as a refrigerating system or a heating system. The valve 47 may be controlled manually or thermostatically or by a manually operated means to select either heating or cooling and a thermostatically operated means to regulate the periods of operation. When the condenser 4 is cooled the pressure at the outlet from the generator 2 maintains solution at some level Y to provide a liquid trap in the bypass conduit. When the condenser is not cooled, the pressure at the outlet from the generator 2 depresses the solution to the level Y' or, in other words, blows the trap to open the bypass to the flow of vapor therethrough.

A purging device is also provided for continually withdrawing non-condensable gases from the absorber 6 and delivering the gases to a storage vessel 50. The purging device is like that described and claimed in United States Letters Patent to Charles A. Roswell Re. 23,093, reissued March 22, 1949, and comprises an auxiliary absorber 51 having a suction tube 52 extending to the center and bottom of the absorber 6 where turbulence is at a minimum. A limited quantity of solution weak in refrigerant is delivered from the conduit 32 to the auxiliary absorber 51 where it absorbs refrigerant vapor to produce a relative partial vacuum for withdrawing non-condensable gases from the absorber 6. A fall tube pump 53 depends from the bottom of the auxiliary absorber 51 into a separating chamber 54 in the conduit 33 and an upwardly directed conduit 55 connects the side of the separating chamber to the storage vessel 50. Solution flows from the auxiliary absorber 51 through the fall tube pump 53 and traps non-condensable gases therein which are transferred to the separating chamber 54. Non-condensable gases then flow from the separating chamber 54 through the upright conduit 55 to the storage vessel 50. As thus far described, the apparatus is substantially the same as that described and claimed in my prior application for United States Letters Patent Serial No. 306,241, referred to above.

In accordance with the present invention a concentration control is provided which will receive and store liquid refrigerant out of solution in accordance with requirements when the apparatus is operated as a refrigerating system and insure the return of the refrigerant to solution when the apparatus is operated as a heating system. In its broadest aspect the invention comprises a concentration control vessel arranged in the bypass conduit 8 and connected to receive liquid refrigerant from the heat exchange element 5 when cooling and solution weak in refrigerant from the generator when heating. In the specific embodiment the separate chamber 39 in the bypass conduit 8 is so constructed and arranged as to perform the additional function of controlling the concentration.

As illustrated in the drawing, a conduit 60 connects the cup 23 at the end of the lowermost tube 19 of the heat exchange element 5 to the side of the separating chamber 39 through which water may flow by gravity from the heat exchange element to the chamber. The drain conduit 41 is connected to the side of the chamber above the bottom thereof to provide a concentration control vessel 61 therebetween for receiving and storing liquid refrigerant. A restricting conduit 62 connects the bottom of the concentration control vessel 61 to the conduit 34 in the solution circuit below the liquid level to drain liquid from the vessel at a slow rate between periods of operation.

The concentration control vessel 61 is of such dimensions and located at the proper height to store varying amounts of liquid refrigerant out of solution in a pressure balancing liquid column when the apparatus is operated as a refrigerating system. The height of the liquid column and amount of refrigerant stored varies in accordance with the difference in pressure between the high and low pressure sides of the system. Such difference in pressure between the high and low pressure sides of the system results from and is functionally related to the condensing temperature. For example, in an apparatus as described above, a condensing temperature of 93° F. will produce a difference of pressure of 31.5 mm. Hg and maintain a column of water 17.0 inches high while a condenser temperature of 110° F. will produce a difference in pressure of 57 mm. Hg and maintain a column of water 30.5 inches high. The concentration control vessel 61 is of a height between its bottom and overflow conduit 41 at least equal to the difference between the minimum and maximum heights of the pressure balancing liquid columns of refrigerant corresponding to the minimum and maximum condenser temperatures expected to be encountered. The lateral dimensions of the concentration control vessel 61 are made to store quantities of refrigerant out of solution functionally related to the condenser temperature to maintain a substantially constant vapor pressure and temperature in the heat exchange element 5 when operating as an evaporator.

When the apparatus is operated as a heating system solution weak in refrigerant is continually supplied to the concentration control vessel 61 by the auxiliary vapor liquid-lift 38. The solution weak in refrigerant mixes with the condensate from the heat exchange element or heating radiator 5 and the mixture overflows through the conduit 41 into the absorber 6. Thus, the concentration control of the present invention, besides controlling the concentratiton of the solution when cooling, also prevents the storage of heating medium out of solution when heating. One form of the invention having now been described in detail, the mode of operation is explained as follows:

When the apparatus is to be operated as a refrigerating system the burner 11 is ignited to heat the generator 2 and the valve 47 is opened to circulate cooling water through the coils 24 of the absorber 6 and the tubes of the condenser 4. Heat supplied to the generator 2 expels refrigerant vapor from absorption solution and the expelled vapor flows upwardly through the vapor liquid lift tube 14 and raises solution therewith into the separating chamber 16. The refrigerant vapor then flows through the vapor pipe 17 into the condenser 4 where it is liquefied. Liquid refrigerant flows from condenser 4 through the orifice device 18 into the uppermost tube 19 of the heat exchange element 5. The liquid refrigerant then flows by gravity through successive tubes 19 from the top to the bottom of the heat exchange element 5 constituting a refrigerant evaporator.

Simultaneously, solution weak in refrigerant flows by gravity from the separating chamber 16 to the absorber 6 in a path of flow including the conduit 31, inner passage 29 of liquid heat exchanger 7 and conduit 32 to the liquid distributor 27. The absorption solution weak in refrigerant is distributed by the liquid distributor 27 onto the top of the uppermost tubes of the absorber coils 24 and thereafter drips onto successive tubes from the top to the bottom of the coils to provide an extended surface of relatively cool absorption solution. Refrigerant vapor is absorbed in the relatively cool absorption solution and, due to the high affinity of the absorbent for refrigerant, produces a vapor pressure in the evaporator 5 corresponding to the vapor pressure of the refrigerant in absorbent at the temperature of the absorber. The refrigerant then evaporates in the tubes 19 of the evaporator 5 at a low pressure and temperature to produce a refrigerating effect on air flowing over the exterior of the tubes 19. Absorption solution strong in refrigerant then flows by gravity from the bottom of the absorber 6 back to the generator 2 in a path of flow comprising the conduit 33, outer passage 28 of the liquid heat exchanger 7 and conduit 34.

As soon as refrigerant vapor is absorbed in the absorber 6 a difference in pressure between the generator 2 and absorber 6 is produced corresponding to the vapor pressure of refrigerant at the condenser temperature and vapor pressure of refrigerant in absorbent at the absorber temperature. Such difference in pressure causes pressure balancing liquid columns to form in the conduits 32 and 33. For example, the liquid will stand at some level X in the outer passage 28 of the liquid heat exchanger constituting a leveling vessel, at level Y in conduit 31 connected to conduit 32 through the inner passage 29 of liquid heat exchanger 7 and at level Z in the conduit 33. Thus, the chamber 37 and conduits 36 and 38 will be immersed to the level Y and form a liquid trap constituting a barrier in the bypass conduit 8 to prevent the flow of vapor therethrough.

At the beginning of a period of operation the relatively dilute absorption solution in the absorber 6 will not produce a sufficiently low vapor pressure and temperature in the evaporator 5 to evaporate all of the refrigerant supplied thereto. As a result, liquid refrigerant will overflow from the lowermost tube 19 of the evaporator 5 through the conduit 60 into the concentration control vessel 61. The overflow of liquid refrigerant from the evaporator 5 to the concentration control vessel 61 where it is stored out of solution will continue until the absorbent becomes sufficiently concentrated to reduce the vapor pressure and temperature in the evaporator 5 to evaporate all of the refrigerant supplied thereto. An equilibrium condition then exists at which the evaporator 5 produces the desired temperature at maximum capacity. The amount of refrigerant received and stored in the concentration control vessel 61 to produce an equilibrium condition varies in accordance with the temperature of the condenser 4. When cold cooling water is supplied, the condenser 4 will operate at its lowest temperature and produce a minimum difference in pressure and thereby store a minimum amount of refrigerant out of solution as indicated by the reference character $a$ in Fig. 2 of the drawing. Thus, a relatively dilute solution is supplied to the absorber 6 at the minimum absorber temperature to prevent the refrigerant in the evaporator 5 from falling below its freezing temperature. On the other hand, when relatively warm cooling water is supplied to produce a maximum condenser temperature a greater difference in pressure will be produced with a corresponding increase in the height of the pressure balancing liquid column to the level $a'$ as illustrated in Fig. 2. The storage of liquid refrigerant out of solution increases the concentration of the latter to compensate for the increased condenser temperature to maintain substantially the same temperature in the evaporator 5. Thus, the concentration control of the present invention compensates for changes in operating conditions such as cooling water temperature to maintain a substantially constant evaporator temperature. The apparatus continues to operate in the manner described above, either continuously or periodically, in accordance with the controls provided. Between periods of operation liquid drains at a slow rate from the concentration control vessel 61 through the conduit 62 to the solution circuit.

When the apparatus is to be operated as a heating system the burner 11 is ignited to heat the generator 2 as previously described but the valve 47 is closed to prevent the circulation of cooling water to the condenser 4. Vapor expelled from solution in the generator 2 raises absorbent into the separating chamber 16, as previously explained. The absorbent initially flows through the solution circuit to the absorber 6. The uncondensed vapor, however, accumulates in the condenser 4 and separating chamber 16 and increases in pressure to depress the liquid level in conduit 31 from level Y to a level Y' below the bottom of the auxiliary lift tube 38. Vapor from the separating chamber 16 then flows through the bypass conduit 8 in a path of flow comprising the pipe 36, chamber 37, auxiliary lift tube 38, separating chamber 39 and conduit 40 directly into the header 20 of the heat exchanger element 5 now constituting a heating radiator. The relatively hot vapor transmits heat through the tubes 19 of heat exchange element 5 to heat the air flowing over the exterior thereof. The transfer of the latent heat of vaporization from the vapor to the air to be cooled causes it to condense and the condensate flows through successive tubes 19 and conduit 60 into the concentration control vessel 61. However, solution weak in refrigerant is continually supplied from the conduit 31 through the liquid line 42 to the chamber 37 and is lifted by the vapor flowing through auxiliary vapor liquid-lift 38 into the separating chamber 39. The solution weak in refrigerant then mixes with the condensate from the heating radiator 5. Some of the mixed solution and condensate flows through the drain conduit 62 but the latter is of such size that it cannot carry all of the solution so that the vessel 61 fills to the level of conduit 41 and overflows through the latter into absorber 6. This provides some solution to mix with any water resulting from condensation on the walls of the absorber shell and avoids the possibility of storage of water in the absorber. Thus, during a heating cycle the storage of heating medium out of solution is positively prevented and thereby insures the supply of dilute solution to the generator 2. The dilute solution in the generator 2 reduces the temperature at which the vapor is expelled and the rate of corrosion which is functionally related to the temperature.

It will now be observed that the present invention provides a concentration control for a heat operated air conditioning apparatus for both heating and cooling which insures a maximum dilution of solution when the apparatus is operated as a heating system. It will also be observed that the present invention provides a concentration control vessel in the bypass conduit which is connected to receive and store refrigerant from the heat exchange element when operating as an evaporator and receive solution weak in refrigerant for mixing with the heating medium when operating as a heating system. It will still further be observed that the present invention provides a concentration control which is of simple and compact construction, economical to manufacture, and reliable in operation.

While a single embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. In a closed heat operated air conditioning apparatus containing a solution of a volatile liquid and absorbent and adapted to be operated as a refrigerating system or heating system, a generator in which vapor of said volatile liquid is expelled from solution by the application of heat, a heat exchange element adapted to operate as a refrigerant evaporator or a heating radiator, a first conduit means connecting the generator and heat exchange element through a liquefier, a second bypass conduit means directly connecting the generator and heat exchange element, means for causing vapor to flow through either the first or second conduit means for cooling or heating operation, respectively, and a concentration control comprising a vessel in the bypass conduit means connected to receive liquid overflowing from the heat exchange element.

2. In a closed heat operated air conditioning apparatus containing a solution of volatile and absorbent fluids, a generator, a condenser, a heat exchange element for either heating or cooling, means for heating the generator to expel volatile fluid from absorbent, conduit means for directing vapor expelled in the generator through the condenser to the heat exchange element to provide a refrigerating system for cooling, a bypass conduit means for directing vapor from the generator directly to the heat exchange element to provide a heating system for heating, and a concentration control comprising a vessel in the bypass conduit connected to receive liquid from the heat exchange element and absorbent from the generator when the apparatus is operated as a heating system.

3. In a closed heat operated air conditioning apparatus containing a solution of volatile and absorbent fluids, a generator in which refrigerant vapor is expelled from solution by the application of heat, a condenser, a heat exchange element operable as a refrigerant evaporator or a heating radiator, an absorber, means connecting the generator, condenser, and the heat exchanger to provide the refrigerant circuit of a two pressure refrigerating system, means connecting the generator and absorber to provide a solution circuit forming pressure balancing liquid columns therebetween, a bypass conduit connecting the generator directly to the heat exchanger to provide a heating system, said bypass conduit providing a path of flow for both the volatile and absorbent fluids, a concentration control comprising a vessel in the bypass conduit connected to receive liquid overflowing from the heat exchange element and deliver liquid to the solution circuit below the liquid level therein, and said vessel being located at a level to store volatile liquid out of solution in a pressure balancing liquid column when the apparatus is operated as a refrigerating system.

4. In a closed heat operated air conditioning apparatus containing a solution of a volatile liquid and absorbent, a generator in which vapor of the volatile liquid is expelled from solution by the application of heat, a vapor liquid-lift utilizing expelled vapor for raising solution for gravity flow in the apparatus, a heat exchange element adapted to operate as a refrigerant evaporator or heating radiator, conduit means connecting the vapor liquid-lift to the heat exchange element and including a vapor liquefier, a second conduit means directly connecting the vapor liquid-lift to the heat exchange element and bypassing the liquefier, a liquid trap in the second conduit means for closing the latter, means for increasing the vapor pressure to blow the trap and deliver vapor directly from the generator to the heat exchange element to operate as a heating system, a concentration control comprising a vessel in the bypass conduit above the liquid trap, a connection for delivering liquid from the heat exchange element to the vessel, and a connection for delivering solution from the trap to the vessel when the apparatus is operated as a heating system.

5. In a vacuum type heat operated air conditioning apparatus containing a solution of a volatile liquid and absorbent and adapted to be operated as a refrigerating system or a heating system, a generator in which vapor of said volatile liquid is expelled from the solution by the application of heat, a condenser, a heat exchange element adapted to operate as a refrigerant evaporator or a heating radiator, an absorber, conduit means connecting the generator, condenser and heat exchange element in series, bypass conduit means directly connecting the generator to the heat exchange element, a solution circuit connecting the generator and absorber, means for cooling the absorber and condenser to operate the apparatus as a refrigerating system, means connecting the solution circuit and bypass conduit means to maintain a liquid trap in the latter when the apparatus is operated as a refrigerating system, means for discontinuing the cooling of the absorber and condenser to operate the apparatus as a heating system, the pressure of said vapor depressing the liquid level in the solution circuit to open the liquid trap and permit the flow of vapor and absorbent through the bypass conduit, and a concentration control comprising a vessel in the bypass conduit and connected to receive liquid from the heat exchange element.

6. In a vacuum type heat operated air conditioning apparatus containing a solution of volatile and absorbent fluids, a generator, a condenser, a heat exchange element for either heating or cooling, an absorber, conduit means connecting the generator, condenser and heat exchange element in series, a bypass conduit for directly connecting the generator to the heat exchange element, a solution circuit connected to provide a liquid trap in the bypass conduit for closing the latter, means for cooling the absorber and condenser to operate the apparatus as a two-pressure refrigerating system in which the difference in pressure between the generator and absorber is maintained by liquid columns in the solution circuit, means for discontinuing the cooling of the absorber and condenser to cause vapor and absorbent to flow through the bypass and operate the apparatus as a heating system, a concentration control comprising a vessel in the bypass conduit connected to receive and store liquid overflowing from the heat exchange element in a pressure balancing liquid column when operating as refrigeration system and mix with solution when operating as a heating system, and a drain conduit connecting the vessel to the solution circuit below the liquid level.

7. In a vacuum type heat operated air conditioning apparatus containing a solution of volatile and absorbent fluids, a refrigerant circuit comprising a generator, a condenser and a heat exchange element, a solution circuit comprising the generator and an absorber and so constructed and arranged as to maintain pressure balancing liquid columns therebetween, a heating circuit comprising the generator and heat exchange element and bypassing the condenser, said heating circuit comprising a receiving chamber below the liquid level in the solution circuit, a vapor liquid-lift projecting upwardly from the receiving chamber and a separating chamber at the upper end of said lift, means for cooling the absorber and condenser to operate the apparatus as a two-pressure refrigerating system, a connection between the solution circuit and receiving chamber to provide a liquid trap in the heating circuit, a conduit connected to deliver liquid refrigerant from the bottom of the heat exchange element to the separating chamber, said separating chamber constituting a concentration control vessel and being so constructed and arranged as to store refrigerant in a pressure balancing liquid column, means for discontinuing the cooling of the absorber and condenser to increase the pressure and depress the liquid level to permit vapor to flow through the heating circuit, and said connection between the solution circuit and receiving chamber feeding solution to the auxiliary vapor liquid lift to mix with condensate from the heat exchange element when heating.

References Cited in the file of this patent

FOREIGN PATENTS 109,654   Australia _____ Feb. 8, 1940